United States Patent
Bimbra et al.

(10) Patent No.: US 9,381,438 B2
(45) Date of Patent: Jul. 5, 2016

(54) DYNAMICALLY DISPLAYING PERSONALIZED CONTENT IN AN IMMERSIVE ENVIRONMENT

(75) Inventors: Surinder S. Bimbra, Rochester, MN (US); Derek Lee Bromenshenkel, Rochester, MN (US); Zachary Adam Garbow, Rochester, MN (US); Daniel Leonard Hiebert, Pine Island, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 958 days.

(21) Appl. No.: 11/936,230

(22) Filed: Nov. 7, 2007

(65) Prior Publication Data

US 2009/0115776 A1    May 7, 2009

(51) Int. Cl.
  *G06F 3/048* (2013.01)
  *A63F 13/69* (2014.01)
  *H04N 21/4545* (2011.01)

(52) U.S. Cl.
  CPC ......... *A63F 13/69* (2014.09); *A63F 2300/5553* (2013.01); *A63F 2300/8082* (2013.01); *H04N 21/45452* (2013.01)

(58) Field of Classification Search
  CPC .......... G06F 3/04815; G06F 17/30041; G06T 13/40
  USPC ................................. 715/757, 706, 753, 962
  See application file for complete search history.

(56) References Cited

U.S. PATENT DOCUMENTS

| | | | | |
|---|---|---|---|---|
| 6,934,747 B1 * | 8/2005 | McGrath et al. | ............... | 709/224 |
| 6,981,220 B2 * | 12/2005 | Matsuda | ........................ | 715/706 |
| 7,073,129 B1 * | 7/2006 | Robarts | .................. | G06Q 10/10 463/36 |
| 8,683,333 B2 * | 3/2014 | Garbow | ................. | G06Q 30/02 715/706 |
| 2002/0097267 A1 * | 7/2002 | Dinan et al. | ................... | 345/757 |
| 2003/0005439 A1 * | 1/2003 | Rovira | ............................ | 725/37 |
| 2006/0010240 A1 * | 1/2006 | Chuah | ..................... | G06Q 50/01 709/228 |
| 2007/0063999 A1 * | 3/2007 | Park | ........................ | H04L 67/38 345/419 |
| 2007/0101276 A1 * | 5/2007 | Yuen | ............................. | 715/757 |
| 2008/0263460 A1 * | 10/2008 | Altberg et al. | ................. | 715/757 |
| 2008/0307473 A1 * | 12/2008 | Allen | ...................... | A63F 13/12 725/104 |
| 2009/0030774 A1 * | 1/2009 | Rothschild et al. | ............. | 705/10 |

* cited by examiner

*Primary Examiner* — Omar Abdul-Ali
(74) *Attorney, Agent, or Firm* — Patterson + Sheridan, LLP

(57) ABSTRACT

Embodiments of the invention provide a method of managing content filters within a three dimensional (3D) immersive environment without compromising the visual and interactive integrity of the environment itself. In one embodiment, content may be selectively filtered by dynamically categorizing content within the immersive environment by tracking baseline avatar patterns. Once a pattern is identified between a given content element (i.e., some element of the environment which an avatar may interact with) and avatar interactions (or lack of interactions) with that content element, a filter may be defined and applied to that content element.

24 Claims, 5 Drawing Sheets

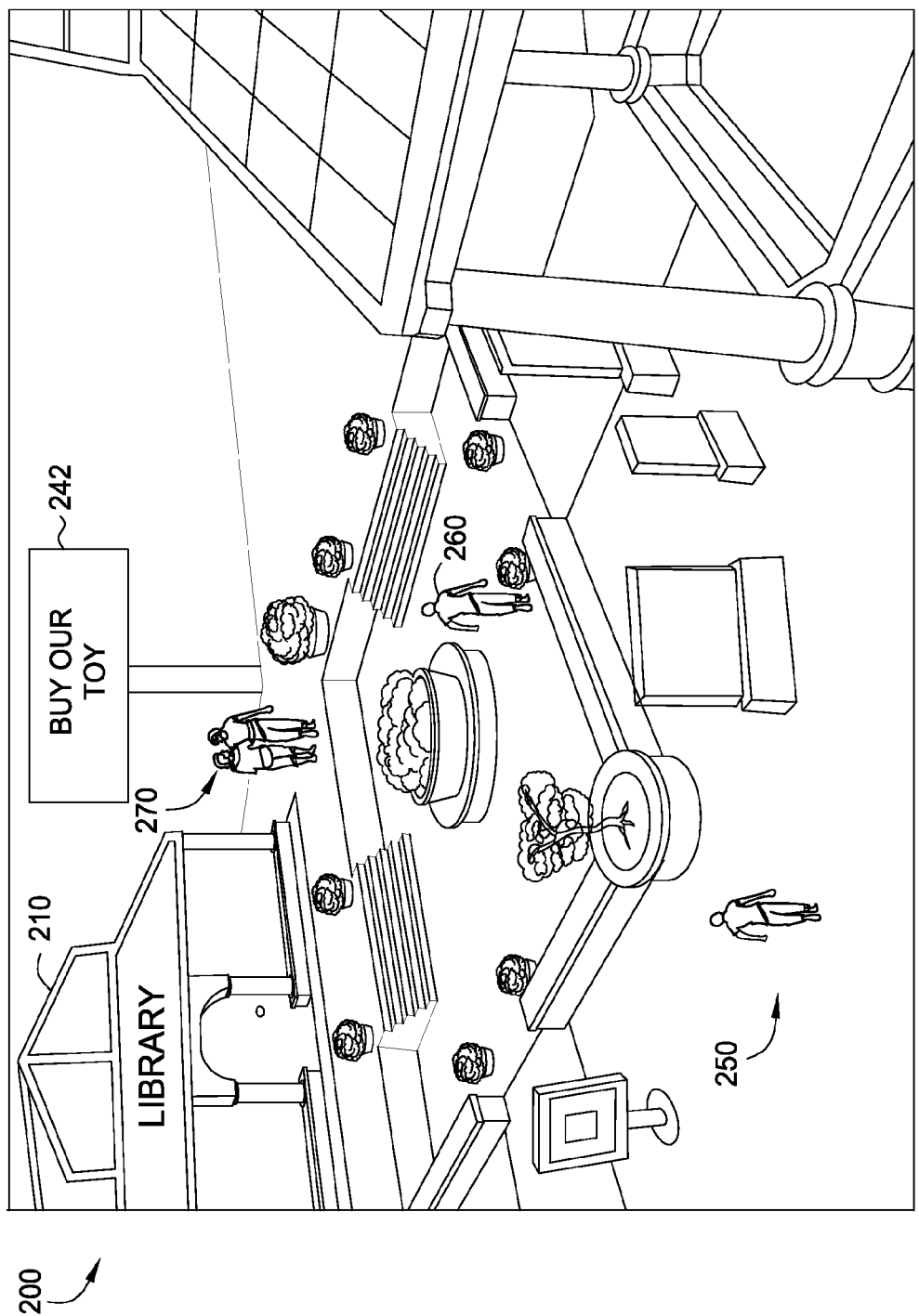

DYNAMICALLY DISPLAYING PERSONALIZED CONTENT IN AN IMMERSIVE ENVIRONMENT

BACKGROUND OF THE INVENTION

1. Field of the Invention

The field of the invention relates to immersive environment presentation, specifically to dynamically displaying personalized content in an immersive environment.

2. Description of the Related Art

A virtual world is a simulated environment in which users may inhabit and interact with one another via avatars. An avatar generally provides a graphical representation of an individual within the virtual world environment. Avatars are usually presented to other users as two or three-dimensional graphical representations of humanoids. Frequently, virtual worlds allow for multiple users to enter and interact with one another. Virtual worlds provide an immersive environment as they typically appear similar to the real world, with real world rules such as gravity, topography, locomotion, real-time actions, and communication. Communication may be in the form of text messages sent between avatars, but may also include real-time voice communication.

Virtual worlds may be persistent. A persistent world provides an immersive environment (e.g., a fantasy setting used as a setting for a role-playing game) that is generally always available, and world events happen continually, regardless of the presence of a given avatar. Thus, unlike more conventional online games or multi-user environments, the plot and events continue to develop even while some of the players are not playing their characters.

In the 2D environment, a user browses web-sites, which provide static content, such as words, images, and video. Self-regulation and software filters effectively set content parameters in the 2D environment. A user can typically avoid being exposed to unwanted content in 2D web browsing by simply avoiding controversial or provocative material and websites. Further, it is possible for employers and parents to screen out content inappropriate in work and family environments by through the use of simple filters.

SUMMARY OF THE INVENTION

The present invention generally provides a method, apparatus, and articles of manufacture for dynamically presenting personalized content in an immersive environment.

One embodiment of the invention includes a computer-implemented method for dynamically filtering and displaying personalized content in an immersive virtual environment. The method may generally include generating the immersive virtual environment. The immersive virtual environment may define a virtual space configured to allow a plurality of avatars to interact with content elements included in the immersive virtual environment and with one another and a user profile associated with a first avatar may specify an active tag used to selectively filter at least one of the content elements form the virtual space provided by the immersive virtual environment. The method also includes determining a collection of content elements of the immersive virtual environment that are potentially viewable by the first avatar. For each content element in the collection of content elements, it is determined whether a given content element should be modified, based on the active tag specified in the user profile of the first avatar. Upon determining that the given content element should be modified, the given content element is modified based on the active tag specified in the user profile of the first avatar. The method also includes displaying the collection of viewable content elements to the first avatar, including displaying any content elements modified based on the active tag specified in the user profile of the first avatar.

Another embodiment of the invention includes a computer storage medium containing a program which, when executed, performs an operation for dynamically filtering and displaying personalized content in an immersive virtual environment. The operation may generally include generating the immersive virtual environment. The immersive virtual environment may define a virtual space configured to allow a plurality of avatars to interact with content elements included in the immersive virtual environment and with one another. Also, a user profile associated with a first avatar may specify an active tag used to selectively filter at least one of the content elements form the virtual space provided by the immersive virtual environment. The operation may further include determining a collection of content elements of the immersive virtual environment that are potentially viewable by the first avatar. For each content element in the collection of content elements, it is determined whether a given content element should be modified, based on the active tag specified in the user profile of the first avatar. Upon determining that the given content element should be modified, the given content element is modified based on the active tag specified in the user profile of the first avatar. The operation also includes displaying the collection of viewable content elements to the first avatar, including displaying any content elements modified based on the active tag specified in the user profile of the first avatar.

Still another embodiment of the invention includes a system having a processor and a memory containing a program configured to provide an immersive virtual environment. When executed on the processor, the program may generally be configured to generate the immersive virtual environment defining a virtual space configured to allow a plurality of avatars to interact with content elements included in the immersive virtual environment and with one another. Also, a user profile associated with a first avatar may specify an active tag used to selectively filter at least one of the content elements form the virtual space provided by the immersive virtual environment. The program may be further configured to determine a collection of content elements of the immersive virtual environment that are potentially viewable by the first avatar. For each content element in the collection of content elements, it is determined whether a given content element should be modified, based on the active tag specified in the user profile of the first avatar. And upon determining that the given content element should be modified, the program may modify the given content element based on the active tag specified in the user profile of the first avatar. The program may be further configured to display the collection of viewable content elements to the first avatar, including displaying any content elements modified based on the active tag specified in the user profile of the first avatar.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2C is an example screen display from an immersive virtual environment, according to one embodiment of the invention.

DETAILED DESCRIPTION OF THE PREFERRED EMBODIMENTS

Figure 1:
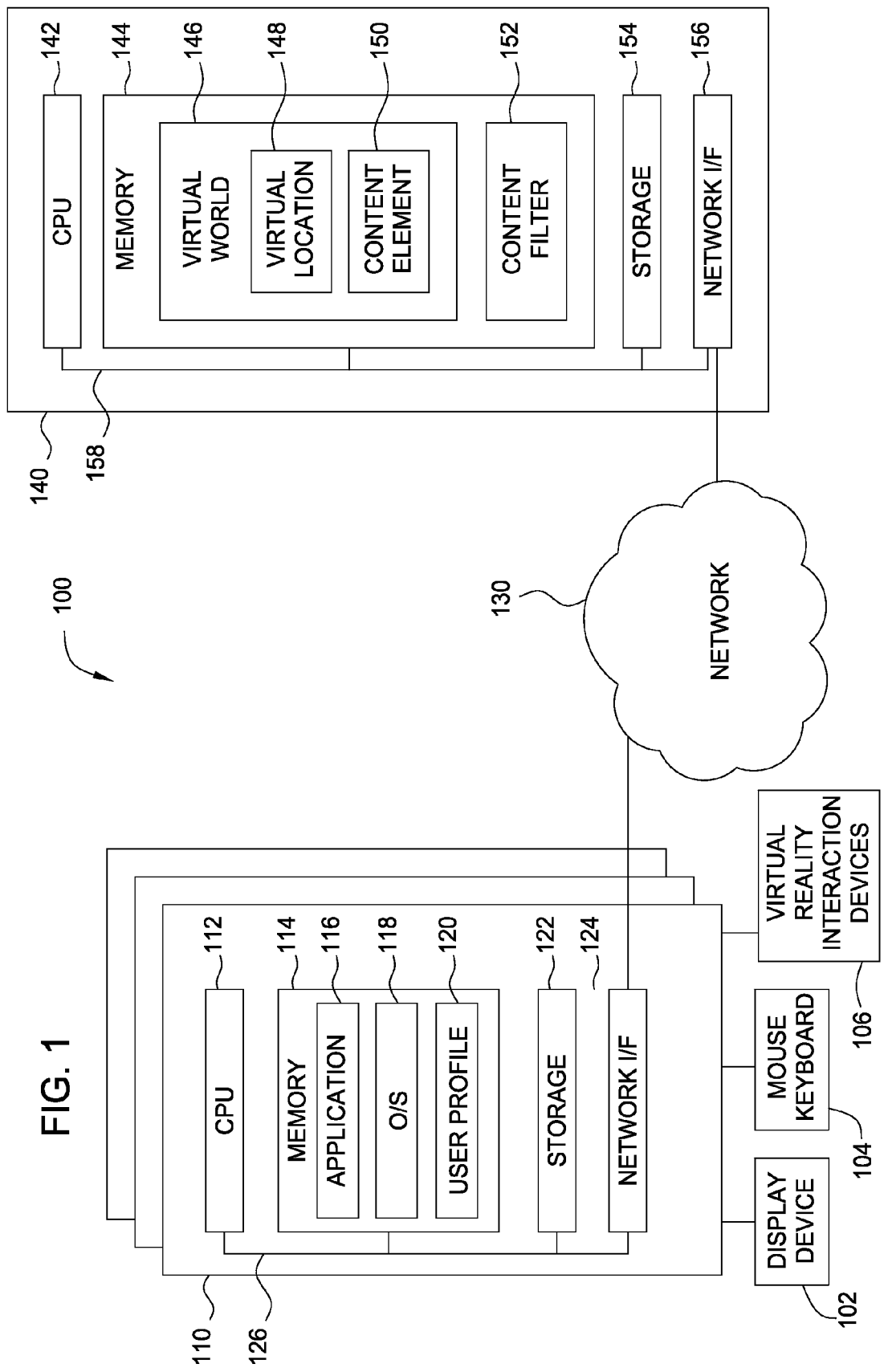
FIG. 1 is a block diagram illustrating a system for dynamically displaying personalized content in an immersive environment, according to one embodiment of the invention.

In an immersive virtual environment, the challenge of limiting content to that appropriate for a particular user is more complex than it is for simple web-filtering. Much of the content in immersive environments is beyond the control of the user because virtual worlds present some content unilaterally, without deference to a user's specific needs or tastes. Further, some content may be dynamically created and presented by other users within the immersive environment. Because the immersive environment is dynamic, new buildings, characters, and other content may rapidly change. Thus, content may be introduced that may be offensive to some users, but desirable to others.

Moreover, what content a given user may wish to (or to not) be exposed to may depend on context. For example, while at work, a user may not want to be distracted by content irrelevant (or inappropriate) to work-related tasks. In contrast, while at home, the same user may prefer as expansive an immersive environment experience as possible. Because of the inherently dynamic nature of immersive environments, traditional filters are impractical. In an immersive environment, users can be confronted with inappropriate and irrelevant content without express requests for the content.

Embodiments of the invention provide a method of managing content filters within a three dimensional (3D) immersive environment without compromising the visual and interactive integrity of the environment itself. In one embodiment, content may be selectively filtered by dynamically categorizing content within the immersive environment by tracking baseline avatar patterns. Once a pattern is identified between a given content element (i.e., some element of the environment which an avatar may interact with) and avatar interactions (or lack of interactions) with that content element, a filter may be defined and applied to that content element. For example, assume that avatars associated with an active tag of "work," do not interact with, and may even avoid, a given element of the immersive environment. Assume further that the content is tagged with a label of "pin-up artwork." In such a case, the situational filter may prevent this element, and other elements labeled with the "pin-up artwork" from being displayed to avatars tagged with the active tag of "work." The filtered objects can include billboards, businesses, interactions, objects, advertisements and even other avatars.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a system 100 for dynamically displaying personalized content in an immersive environment, according to one embodiment of the invention. As shown, system 100 includes client computers 110, a network 130, and a server computer 140. Client computer 110 and server computer 140 are intended to represent any type of computer, computer system or other programmable electronic device, including a portable computer, an embedded controller, a PC-based server, a minicomputer, a midrange computer, a mainframe computer, and other computers adapted to support embodiments of the invention. The network 130 could be any communications or computer network, or collection of networks capable of facilitating communications between the client 110 and the server 140. In one embodiment, the network 130 is the internet.

As shown, client 110 includes a central processing unit (CPU) 112, which obtains instructions and data via a bus 126 from a main memory 114 and storage 122. The processor 112 could be any processor adapted to support the methods of the invention. The main memory 114 is any memory sufficiently large to hold the necessary programs and data structures. The main memory 114 could be one or a combination of memory devices, including Random Access Memory, nonvolatile or backup memory, (e.g., programmable or flash memories, read-only memories, etc.). In addition, main memory 114 and storage 122 may include memory physically located elsewhere in a client 110, for example, on another computer coupled to the client 110. Finally, client 110 is operably connected to the network 130 by a network interface 124.

Main memory 114 includes an operating system 118. Operating system 118 is the software used for managing the operation of the client 110. Examples of operating systems 118 include UNIX, a version of the Microsoft Windows® operating system, and distributions of the Linux® operating system. (Note, Linux is at trademark of Linus Torvalds in the United States and other countries.)

Illustratively, main memory 114 also includes a client application 116 and a user profile 120. In one embodiment, client application 116 provides a software program that allows a user to connect to a virtual world 146, and once connected, to explore and interact with virtual world 146. Further, client application 116 may be configured to generate and display a visual representation of the user within the immersive environment, generally referred to as an avatar. The avatar of the user is generally visible to other users in the virtual world, and the user may view avatars representing the other users. The client application 116 may also be configured to generate and display the immersive environment to the user and to transmit the user's desired actions to a virtual world 146 on server 140. The client application 116 may also be configured to generate and present the user with a display of the virtual world. Such a display generally includes content from the virtual world determined from the avatar's line of sight at any given time. For the user, the display may include the avatar of that user or may be a camera eye where the user sees the virtual world through the eyes of the avatar representing this user.

The user may view the virtual world using a display device 102, such as an LCD or CRT monitor display, and interact with the client application using a mouse and keyboard 104. Further, in one embodiment, the user may interact with client application 116 and virtual world 146 using a variety of virtual reality interaction devices 106. For example, the user may don a set of virtual reality goggles that have a screen display for each lens. Further, the goggles could be equipped with motion sensors that cause the view of the virtual world presented to the user to move based on the head movements of the individual. As another example, the user could don a pair of gloves configured to translate motion and movement of the user's hands into avatar movements within the virtual reality environment. Of course, embodiments of the invention are not limited to these examples and one of ordinary skill in the art will readily recognize that the invention may be adapted for use with a variety of devices configured to present the virtual world to the user and to translate movement/motion or other actions of the user into actions performed by the avatar representing that user within virtual world 146.

Within virtual world 146, avatars can interact with other avatars, as well as with elements of the virtual world 146. For example, a user with avatar A could click on an avatar B to start an instant message conversation with the user associated with avatar B. In an example of avatar's interacting with elements of virtual world 146 environment, the user with avatar A could click on a building within the virtual world labeled as a library. In response, the client application 116 could cause the avatar representing user A to walk to the library, enter a lobby area and present the user with the interior of the library, including a virtual librarian, card catalog, and other library visitors "present" at that location within virtual world 146.

In one embodiment, user profile 120 may describe roles that a user on a particular client 110 may have in an immersive environment. Each role may be associated with a different tag value. Further, the user may have multiple roles in an immersive environment. For example, the user may have a 'Work' tag to use while interacting with virtual world 146 using a client system 110 at that user's work. The same user may also have a 'Personal' tag to use while interacting with the virtual world 146 using a client system 110 at that user's home. In one embodiment, the content presented to the user may be filtered based on which tag is active for the user at any given time. Further, in one embodiment, advertisers may purchase advertising space within a virtual world. In such a case, the tags included in user profile 120 may be used to target products for sale appropriate to a user's particular role. For example, while the user has a "work" tag active, advertising related to office supplies or consulting services could be displayed that user.

Advantageously, by exploring immersive environments under different tags, a user may experience the same immersive environment in many different ways. Under a 'Work' tag, a user's content and content choices could be limited to work-appropriate and work-related activities. Similarly, under a 'Personal' tag, a user could experience a more expansive and entertaining of the same immersive environment. Similarly, in one embodiment, tags may define a ratings scale similar to the rating scale for used by the MPAA for movies (i.e., G, PG, PG-13, R, NC-17). Thus, a child with a G-rated tag, exploring virtual world 146 could be prevented from accessing more mature content tagged with PG (and higher) ratings.

In one embodiment, users may define tags to apply to a given content element (or their avatar) or the tags could be pre-determined and provided by the provider of virtual world 146. By allowing users to select a tag from a pre-determined list, behavior of users of virtual world 146 may be categorized. For example, users with a 'Work' tag may tend to avoid virtual liquor stores. Content presented to users may be based on the users' tags, thereby limiting content to that appropriate to a particular user's role.

As shown, server 140 includes a central processing unit (CPU) 142, which obtains instructions and data via a bus 158 from a main memory 144 and storage 154. The processor 142 could be any processor adapted to support the methods of the invention. The main memory 144 is any memory sufficiently large to hold the necessary programs and data structures. Main memory 144 could be one or a combination of memory devices, including Random Access Memory, nonvolatile or backup memory, (e.g., programmable or Flash memories, read-only memories, etc.). In addition, main memory 114 and storage 154 may be considered to include memory physically located elsewhere in a server 140, for example, on another computer coupled to the server 140 via bus 158. Server 140 is operably connected to the network 130 by a network interface 156.

Memory 144 includes virtual world 146 and a content filter tool 152. As stated, virtual world 146 may be a software application that allows a user to explore and interact with content elements 150 provided by the immersive environment. Illustratively, virtual world 146 includes virtual locations 148 and content elements 150. Virtual locations 148 may define a virtual "space" provided by the virtual world 146, for example, a space representing a street, a room, a town, a building with multiple floors, a forest, or any other configuration of a virtual space. Content elements 150 represent any entity within the virtual space defined by a given virtual locations 146. For example, virtual world 146 could provide a virtual town "Main Street," and include a number of storefronts. In such a case, each building represents an example of a content element 150, such as a public library, a salon, a saloon, a shoe store, and a general store. Further, each storefront could have a sign and advertising displays in a virtual window. In such a case, each such sign and advertising display would be an example of a content element 150. Of course, these provide merely one example of a virtual location 146 and content elements 150.

In one embodiment, content filter tool 152 may provide a software application configured to determine whether to filter a given content element 150 within view of an avatar. Content elements 150 become viewable as an avatar moves through the virtual world 146 or when a user adjusts an avatar's line of sight. As further described below, content filter tool 152 may be configured to filter content elements 150 based on tags assigned to an avatar at any given time (e.g., the "work" or "personal" tags discussed above) and the history of that (and other) users interacting (or not interacting) with a given content element 150 while a particular tag is active. Further, in one embodiment, virtual world 146 may associate content elements 150 with different tags.

Figure 2A:
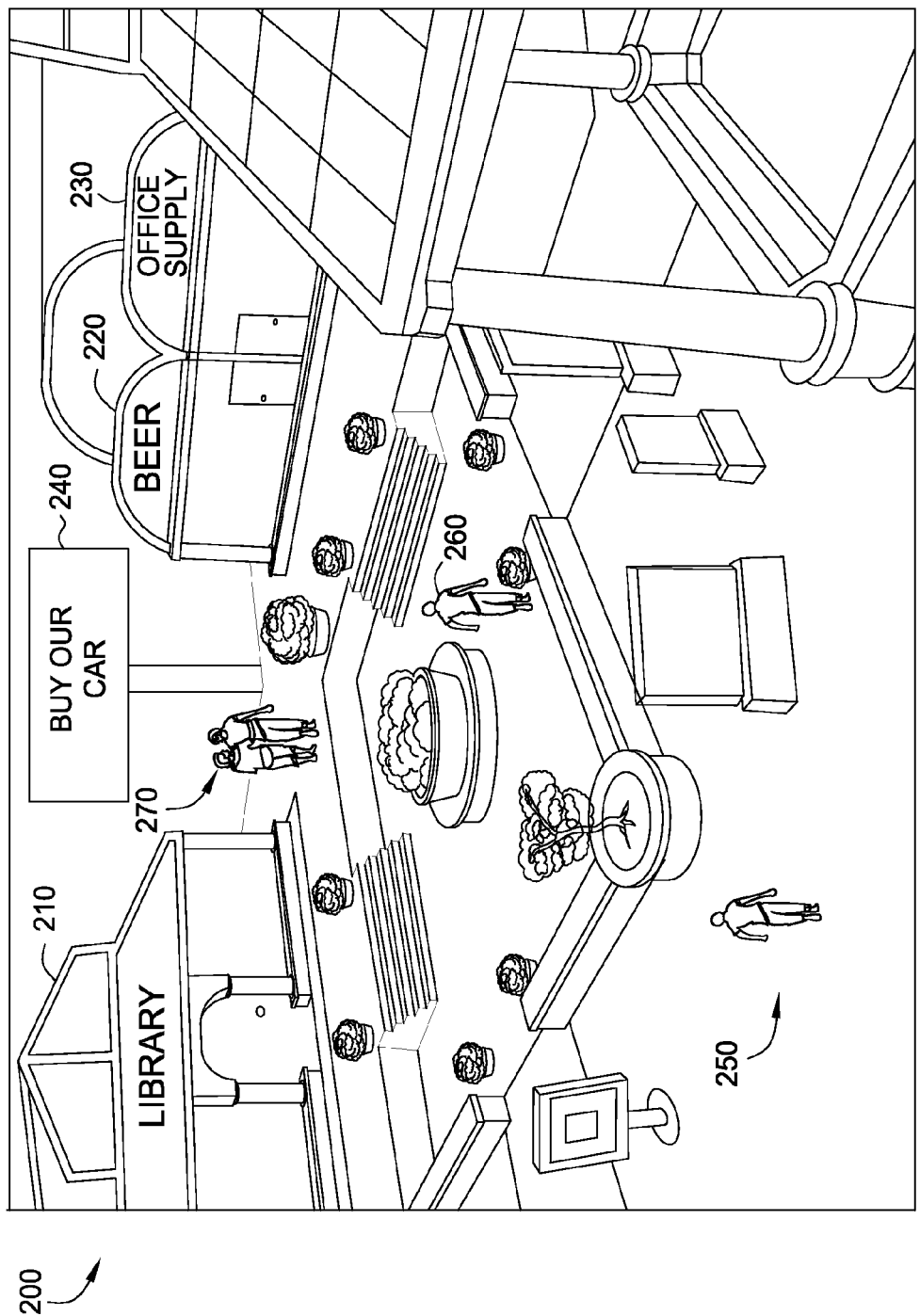
FIG. 2A is an example screen display from an immersive virtual environment, according to one embodiment of the invention.

FIG. 2A is an example screen display from an immersive virtual environment, according to one embodiment of the invention. More specifically, FIG. 2A is a view 200 of a virtual "Main Street" for an avatar 250 using a 'Personal' tag. Illustratively, the view 200 of this virtual "Main Street" includes a library 210, a liquor store 220, an office supply store 230, and a billboard 240. This virtual location 148 also includes avatars 260 and 270.

Figure 2B:
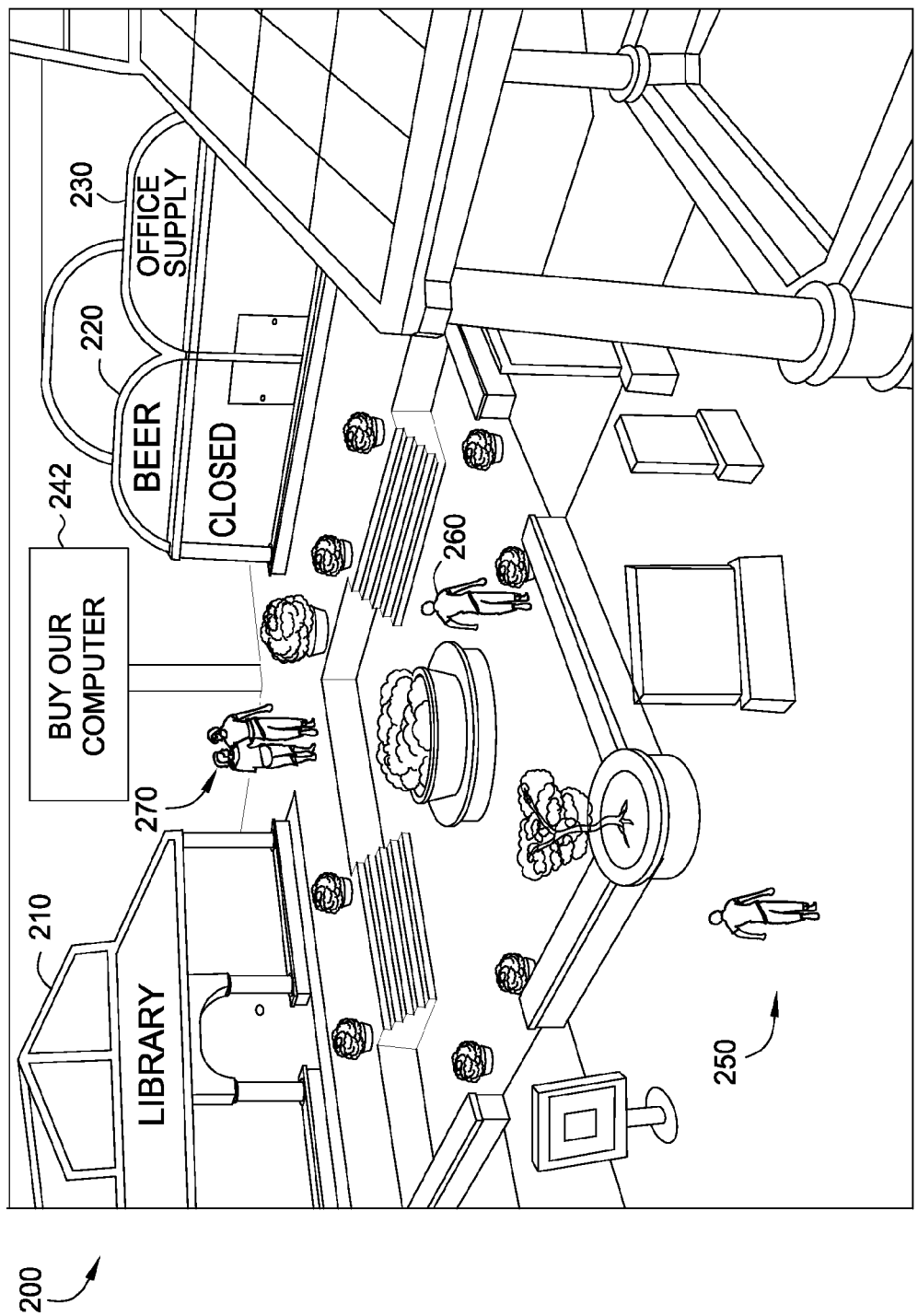
FIG. 2B is an example screen display from an immersive virtual environment, according to one embodiment of the invention.

In one embodiment, content filter tool 152 may present elements of the virtual Main Street to a given user differently, depending on a currently active tag specified for that user. For example, as shown in FIGS. 2A-2C, the content billboard 240 is presented differently, based on which one of users 250, 260, and 270 is viewing this portion of the virtual Main Street. As is shown in FIG. 2A, for avatar 240 using a 'Personal' tag, billboard 240 is presented as an automobile advertisement.

FIG. 2B is an example screen display from an immersive virtual environment, according to one embodiment of the invention. More specially, FIG. 2B illustrates a view 202 of the virtual Main Street as seen by avatar 260 using a 'Work' tag. Illustratively, for avatar 260, the content of billboard 244 displays a computer advertisement, targeted to users with a 'Work' tag.

In one embodiment, content filter tool 152 may be configured to track the actions of a user while that user navigates through the virtual world. Based on the interaction a user engages in with the virtual world and with other avatars while a given tag is active, content filter tool 152 may learn which content element 150 a user is likely (or unlikely) to interact with while the tag is active. Using the 'work' tag as an example, content filter tool 152 may determine that less than one percent of users with the "work" tag actively interact with the liquor store 220. In such a case, content filter tool 152 may present users with the "work" tag active with an alternate view of the liquor store 220. FIG. 2B illustrates this example by displaying liquor store 220 with a 'CLOSED' sign in the window to avatar. Advantageously, by presenting content elements 150 based on a user's active tag, content filter tool 152 may limit the distractions for a user exploring an immersive environment in a particular role, such as a user at work in an office.

FIG. 2C is an example screen display from an immersive virtual environment, according to one embodiment of the invention. More specifically, FIG. 2C illustrates a view 204 of the virtual Main Street as seen by avatar 270. Assume for this example that avatar 270 represents a child user with an active "child" tag. Illustratively, for avatar 270, the content of billboard 244 displays an advertisement for a toy product with a "child" tag. Further, storefronts for the liquor store 220 and for the office supply store 230 are removed from the environment entirely.

In one embodiment, users may specify how the content filter tool 152 operates to filter content elements 150, based on a given active tag. For example, instead of presenting an alternate element when filtering items from the virtual world, a user may specify that the content filter 152 not present filtered elements at all. Thus, for avatar 270 (with an active "child" tag), the content filter tool 152 removes the liquor store 220 from the virtual world because the "child" rating specifies that avatars with this tag active should be prohibited from viewing this storefront. Additionally, the content filter tool 152 may remove the storefront for the office supply store 230 because, over time, it is determined that very few avatars with an active "child" tag interact with the office supply store 230. Thus, by specifying what type of filter to apply, users can customize how the virtual world is presented according to their own needs.

Figure 3:
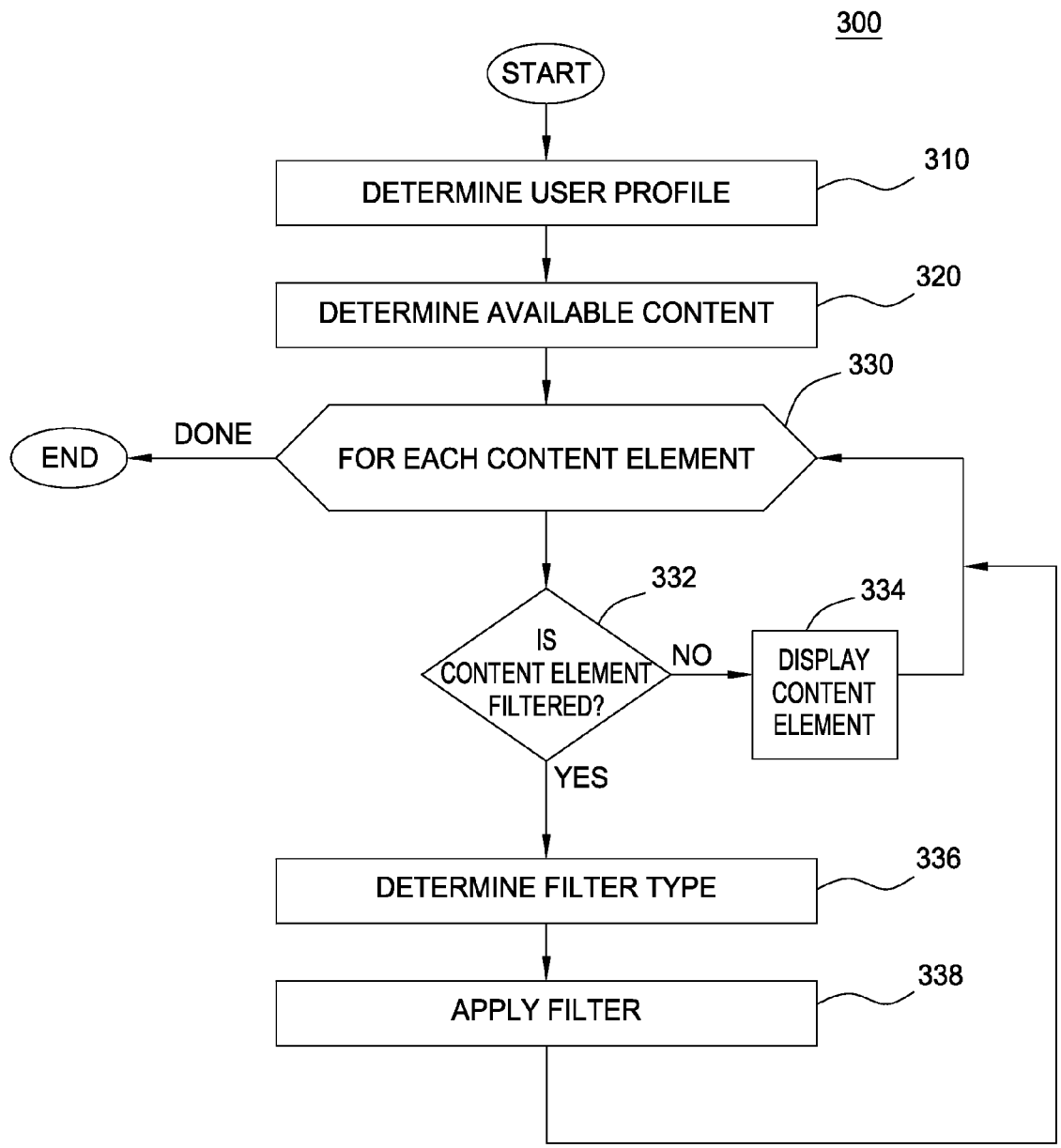
FIG. 3 is a flowchart illustrating a method for dynamically displaying personalized content in an immersive environment, according to one embodiment of the invention.

FIG. 3 is a flowchart illustrating a process 300 for dynamically displaying personalized content in an immersive environment, according to one embodiment of the invention. As described above, a user explores a virtual world by controlling the actions of an avatar within that virtual world. As the user moves their avatar through the virtual space, the portions of the virtual world displayed to the user changes accordingly. Process 300 operates to dynamically modify what content is presented to the user while the user interacts with the virtual world. At step 310, the content filter tool 152 identifies the currently active tag associated with the user.

At step 320, when the user moves their avatar to a new location within the virtual world, or adjusts the avatar's view, the content filter tool 152 may determine which content elements 150 are "visible" to the avatar based on the position of the avatar within the virtual world. At step 330 a loop beings that includes steps 332, 334, 336, and 338. During each pass through the loop, the content filter tool 152 evaluates one of the visible content elements 150 determined at step 320 against the active tags associated with an avatar.

At step 332, the content filter tool 152 may determines whether to filter one of the content elements 150 identified at step 320. If that content element 150 is not subject to filtering, then at step 334, the element is included in displays of the virtual world presented to the user. Otherwise, at steps 336 and 338, the content filter tool 152 may determine whether the content element 150 currently being evaluated should be presented to the user.

Further, in one embodiment, users may specify a threshold used to fine tune what elements are presented while interacting with a virtual world. The threshold may be specified within user profile 120. For example, when a "work" tag is active for a given avatar, a user may set a low threshold for triggering the filter 152 to limit content unrelated to that user's work purpose for entering the virtual world. In contrast, when a "personal" tag is active, a user may set a high threshold, aiming to limit filtered content, and provide as expansive an experience as possible. By setting thresholds, a user's experience is not simply restricted to the scope of behavior of those using the same tag. In some embodiments, the user may have the flexibility to establish thresholds along a continuum, enabling the user to more narrowly or more expansively present content elements 150.

At step 336, the content filter tool 152 may determine what type of filter to apply to the content element. In one embodiments, a content provider (e.g., the operator of a liquor store within the virtual world), may provide alternate content element 150, such as the closed liquor store illustrated in FIG. 2C. Alternatively, content filter tool 152 may present the virtual world without the filtered content element 150. At step 338, the content filter tool 152 applies the filter to the content element 150 currently being evaluated. Accordingly, for an avatar with a "child" tag active, such as avatar 270 illustrated in FIG. 2C, the content filter tool 152 may present a virtual Main Street location 148 without the content elements representing the storefronts of liquor store 220 and office supply store 230.

While the foregoing is directed to embodiments of the present invention, other and further embodiments of the invention may be devised without departing from the basic scope thereof, and the scope thereof is determined by the claims that follow.

What is claimed is:

1. A computer-implemented method to selectively tailor content to users of a virtual environment, based on relevance to user contexts outside of the virtual environment, the computer-implemented method comprising:
concurrently outputting, to each of a first user, a second user, and a third user, a plurality of avatars proximate to one another in a virtual environment, the plurality of avatars including a first avatar of the first user, a second avatar of the second user, and a third avatar of the third user;
determining that a first content element is relevant to each of the first, second, and third users, based on user context indicators describing contexts of the first, second, and third users, respectively, outside of the virtual environment, and based further on a content descriptor of the first content element;
upon determining that the first content element is relevant to the first, second and third users, concurrently outputting the first content element to the first, second, and third users, without modification;
determining that a second content element is relevant to the first user, is only partially relevant to the second user, and is irrelevant to the third user, based on the user context indicators of the first, second, and third users, and based further on a content descriptor of the second content element; and
upon determining that the second content element bears relevance to the first user, bears partial relevance to the second user, and bears no relevance to the third user, then concurrently and by operation of one or more computer processors:
outputting the second content element to the first user without modification;
outputting the second content element to the second user with modification in order to increase relevance of the second content element to the second user, without requiring intervention from the second user; and
precluding the second content element from being output to the third user altogether, without requiring intervention from the third user.

2. The computer-implemented method of claim 1, wherein output of a third content element is tailored based on an extent of previous avatar interaction with the third content element.

3. The computer-implemented method of claim 2, wherein the output of the third content element is tailored based further on a sensitivity threshold specifying how aggressively content elements are selectively filtered, based on extents of previous avatar interaction.

4. The computer-implemented method of claim 1, wherein outputting the second content element to the second user with modification includes replacing an original content of the second content element with an alternate content for the second content element.

5. The computer-implemented method of claim 1, wherein the second content element is an advertisement, wherein the second content element is modified by selecting alternate content for the advertisement.

6. The computer-implemented method of claim 1, wherein the user context indicator of the second user includes a user maturity rating specifying an age-appropriate viewing level for the second user, wherein the content descriptor of the second content element includes a content maturity rating specifying an age-appropriate viewing level for the second content elements.

7. The computer-implemented method of claim 1, wherein outputting the second content element to the second user with modification includes replacing an original content of the second content element with an alternate content for the second content element.

8. The computer-implemented method of claim 7, wherein output of a third content element is tailored based on: an extent of previous avatar interaction with the third content element and qualified by user context indicator.

9. The computer-implemented method of claim 8, wherein the output of the third content element is tailored based further on a sensitivity threshold specifying how aggressively content elements are selectively filtered, based on extents of previous avatar interaction qualified by user context indicators.

10. The computer-implemented method of claim 9, wherein the second content element is an advertisement, wherein the second content element is modified by selecting alternate content for the advertisement.

11. The computer-implemented method of claim 10, wherein the user context indicator of the second user includes a user maturity rating specifying an age-appropriate viewing level for the second user.

12. The computer-implemented method of claim 11, wherein the content descriptor of the second content element includes a content maturity rating specifying an age-appropriate viewing level for the second content element.

13. A non-transitory computer-readable medium containing a program which, when executed, performs an operation to selectively tailor content to users of a virtual environment, based on relevance to user contexts outside of the virtual environment, the operation comprising:
concurrently outputting, to each of a first user, a second user, and a third user, a plurality of avatars proximate to one another in a virtual environment, the plurality of avatars including a first avatar of the first user, a second avatar of the second user, and a third avatar of the third user;

determining that a first content element is relevant to each of the first, second, and third users, based on user context indicators describing contexts of the first, second, and third users, respectively, outside of the virtual environment, and based further on a content descriptor of the first content element;

upon determining that the first content element is relevant to the first, second and third users, concurrently outputting the first content element to the first, second, and third users, without modification;

determining that a second content element is relevant to the first user, is only partially relevant to the second user, and is irrelevant to the third user, based on the user context indicators of the first, second, and third users, and based further on a content descriptor of the second content element; and upon determining that the second content element bears relevance to the first user, bears partial relevance to the second user, and bears no relevance to the third user, then concurrently and by operation of one or more computer processors when executing the program:

outputting the second content element to the first user without modification;

outputting the second content element to the second user with modification in order to increase relevance of the second content element to the second user, without requiring intervention from the second user; and precluding the second content element from being output to the third user altogether, without requiring intervention from the third user.

14. The non-transitory computer-readable storage medium of claim 13, wherein output of a third content element is tailored based on an extent of previous avatar interaction with the third content element.

15. The non-transitory computer-readable medium of claim 14, wherein the output of the third content element is tailored based further on a sensitivity threshold specifying how aggressively content elements are selectively filtered, based on extents of previous avatar interaction.

16. The non-transitory computer-readable medium of claim 13, wherein outputting the second content element to the second user with modification includes replacing an original content of the second content element with an alternate content for the second content element.

17. The non-transitory computer-readable medium of claim 13, wherein the second content element is an advertisement, wherein the second content element is modified by selecting alternate content for the advertisement.

18. The non-transitory computer-readable medium of claim 13, wherein the user context indicator of the second user includes a user maturity rating specifying an age-appropriate viewing level for the second user, wherein the content descriptor of the second content element includes a content maturity rating specifying an age-appropriate viewing level for the second content elements.

19. A system to selectively tailor content to users of a virtual environment, based on relevance to user contexts outside of the virtual environment, the system comprising:

a computer processor; and a memory containing a program which, when executed on the computer processor, performs an operation comprising:

concurrently outputting, to each of a first user, a second user, and a third user, a plurality of avatars proximate to one another in a virtual environment, the plurality of avatars including a first avatar of the first user, a second avatar of the second user, and a third avatar of the third user;

determining that a first content element is relevant to each of the first, second, and third users, based on user context indicators describing contexts of the first, second, and third users, respectively, outside of the virtual environment, and based further on a content descriptor of the first content element;

upon determining that the first content element is relevant to the first, second and third users, concurrently outputting the first content element to the first, second, and third users, without modification;

determining that a second content element is relevant to the first user, is only partially relevant to the second user, and is irrelevant to the third user, based on the user context indicators of the first, second, and third users, and based further on a content descriptor of the second content element; and upon determining that the second content element bears relevance to the first user, bears partial relevance to the second user, and bears no relevance to the third user, then concurrently:

outputting the second content element to the first user without modification;

outputting the second content element to the second user with modification in order to increase relevance of the second content element to the second user, without requiring intervention from the second user; and precluding the second content element from being output to the third user altogether, without requiring intervention from the third user.

20. The system of claim 19, wherein output of a third content element is tailored based on an extent of previous avatar interaction with the third content element.

21. The system of claim 20, wherein the output of the third content element is tailored based further on a sensitivity threshold specifying how aggressively content elements are selectively filtered, based on extents of previous avatar interaction.

22. The system of claim 19, wherein outputting the second content element to the second user with modification includes replacing an original content of the second content element with an alternate content for the second content element.

23. The system of claim 19, wherein the second content element is an advertisement, wherein the second content element is modified by selecting alternate content for the advertisement.

24. The system of claim 19, wherein the user context indicator of the second user includes a user maturity rating specifying an age-appropriate viewing level for the second user, wherein the content descriptor of the second content element includes a content maturity rating specifying an age-appropriate viewing level for the second content element.

* * * * *